US006744607B2

United States Patent
Freitag et al.

(10) Patent No.: US 6,744,607 B2
(45) Date of Patent: Jun. 1, 2004

(54) EXCHANGE BIASED SELF-PINNED SPIN VALVE SENSOR WITH RECESSED OVERLAID LEADS

(75) Inventors: James Mac Freitag, San Jose, CA (US); Mustafa Pinarbasi, Morgan Hill, CA (US); Patrick Rush Webb, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 119 days.

(21) Appl. No.: 10/104,457

(22) Filed: Mar. 21, 2002

(65) Prior Publication Data

US 2003/0179507 A1 Sep. 25, 2003

(51) Int. Cl.$^7$ ................................................ G11B 5/39
(52) U.S. Cl. ...................................................... 360/322
(58) Field of Search ................................ 360/322, 320, 360/324.1, 324.11, 324.12

(56) References Cited

U.S. PATENT DOCUMENTS

| | | | | |
|---|---|---|---|---|
| 5,739,990 | A | | 4/1998 | Ravipati et al. ............ 360/113 |
| 6,033,491 | A | | 3/2000 | Lin ............................ 148/108 |
| 6,048,632 | A | | 4/2000 | Soliu et al. ................. 428/692 |
| 6,127,053 | A | * | 10/2000 | Lin et al. .................... 428/692 |
| 6,134,090 | A | * | 10/2000 | Mao et al. ................ 360/324.1 |
| 6,139,906 | A | * | 10/2000 | Hegde et al. ............... 427/125 |
| 6,201,673 | B1 | * | 3/2001 | Rottmayer et al. .... 360/324.12 |
| 6,266,218 | B1 | * | 7/2001 | Carey et al. ........... 360/324.12 |
| 6,344,953 | B1 | * | 2/2002 | Kautzky et al. ............. 360/322 |
| 6,570,745 | B1 | * | 5/2003 | Gill ........................ 360/324.12 |

FOREIGN PATENT DOCUMENTS

JP   2000285414   10/2000   ............ G11B/5/39

* cited by examiner

Primary Examiner—A. J. Heinz
Assistant Examiner—Angel Castro
(74) Attorney, Agent, or Firm—Ervin F. Johnston

(57) ABSTRACT

A spin valve sensor includes an antiparallel (AP) pinned layer structure which is self-pinned without the assistance of an antiferromagnetic (AFM) pinning layer. A free layer of the spin valve sensor has first and second wing portions which extend laterally beyond a track width of the spin valve sensor and are exchange coupled to first and second AFM pinning layers. Magnetic moments of the wing portions of the free layer are pinned parallel to the ABS and parallel to major planes of the layers of the sensor for magnetically stabilizing the central portion of the free layer which is located within the track width. The spin valve sensor has a central portion that extends between the first and second AFM layers. First and second lead layers overlay the first and second AFM layers and further overlay first and second portions of the central portion so that a distance between the first and second lead layers defines a track width that is less than a distance between the first and second AFM layers. The spin valve sensor has a cap layer structure that has a full thickness portion which is located between first and second reduced thickness portions and the first and second lead layers engage the cap layer structure within the first and second reduced thickness portions.

18 Claims, 6 Drawing Sheets

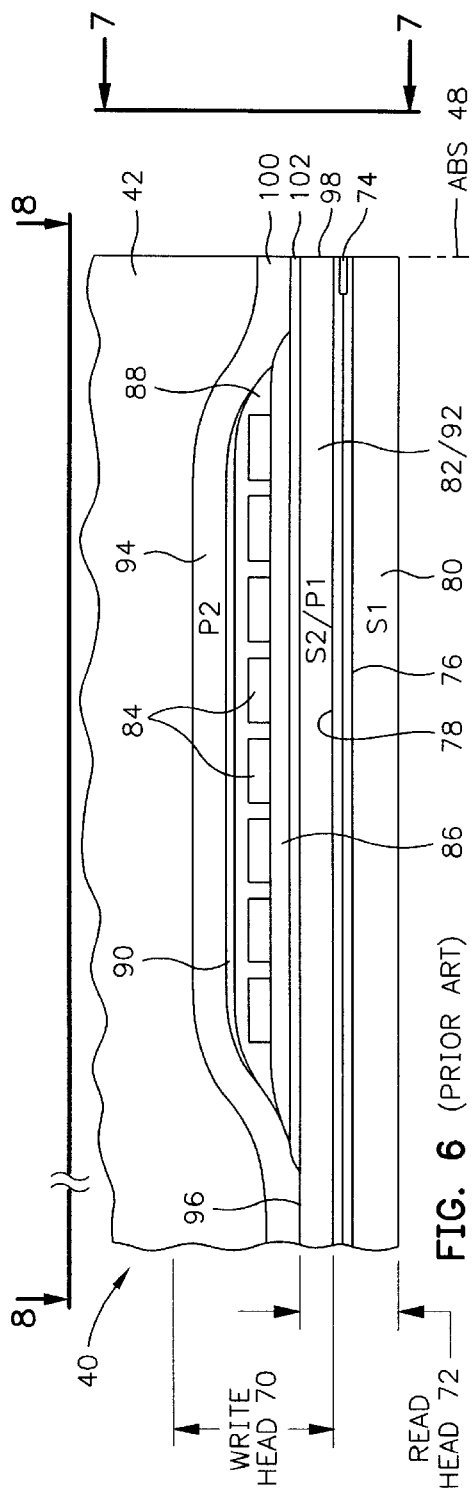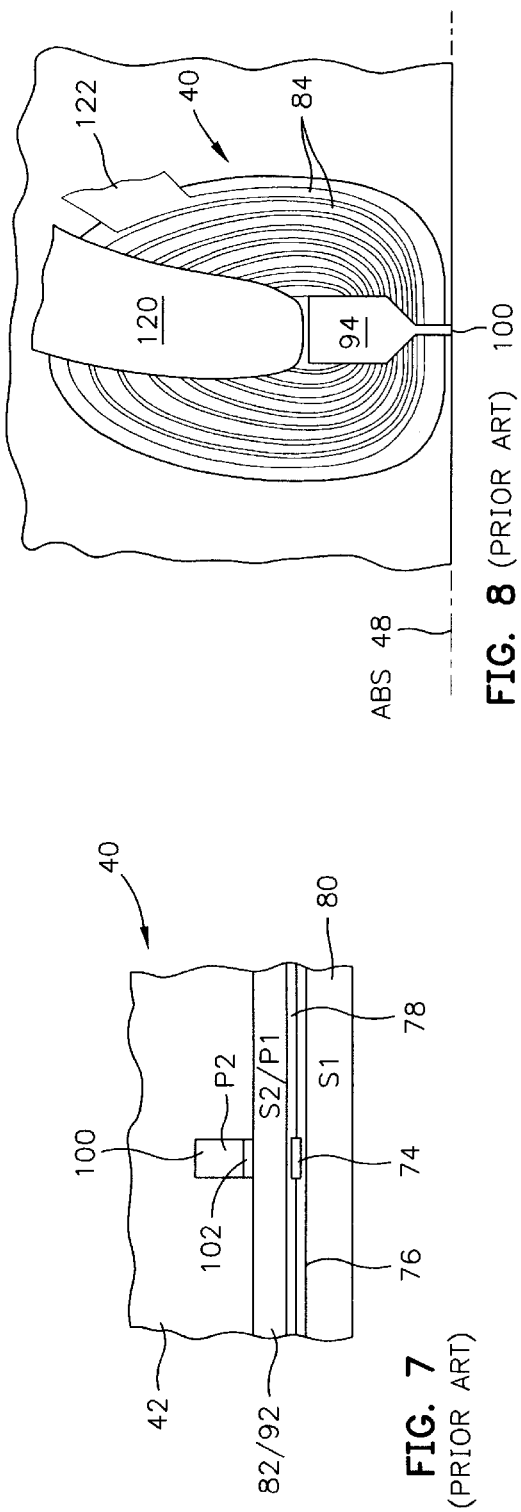

(ABS)

EXCHANGE BIASED SELF-PINNED SPIN VALVE SENSOR WITH RECESSED OVERLAID LEADS

BACKGROUND OF THE INVENTION

1. Field of the Invention

The present invention relates to an exchange biased self-pinned spin valve sensor with recessed overlaid leads and, more particularly, to such a sensor wherein first and second leads engage first and second recessed portions of a cap layer of the sensor so that resistance between the leads and the sensor is reduced.

2. Description of the Related Art

The heart of a computer is a magnetic disk drive which includes a rotating magnetic disk, a slider that has write and read heads, a suspension arm and an actuator arm. When the disk is not rotating the actuator arm locates the suspension arm so that the slider is parked on a ramp. When the disk rotates and the slider is positioned by the actuator arm and suspension arm above the disk, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer typically interfaces the pinned layer structure for pinning a magnetic moment of the pinned layer structure 90° to the air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from the rotating magnetic disk. The quiescent position, which is preferably parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a bottom spin valve sensor or a top spin valve sensor depending upon whether the pinned layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel to one another. Spin valve sensors are still further classified as single or dual wherein a single spin valve sensor employs only one pinned layer and a dual spin valve sensor employs two pinned layers with the free layer structure located therebetween.

As stated hereinabove, a magnetic moment of the aforementioned pinned layer structure is pinned 90° to the ABS by the aforementioned antiferromagnetic (AFM) pinning layer. After deposition of the sensor layers the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to room temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields do not disturb the setting of the pinning layer. It is also desirable that the pinning layer be as thin as possible since it is located within the track width of the sensor and its thickness adds to an overall gap length between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

A scheme for minimizing the aforementioned gap between the first and second shield layers is to provide a self-pinned AP pinned layer structure. The self-pinned AP pinned layer structure eliminates the need for the aforementioned pinning layer which permits the read gap to be reduced by 120 Å when the pinning layer is platinum manganese (PtMn). In the self-pinned AP pinned layer structure each AP pinned layer has an intrinsic uniaxial anisotropy field and a magnetostriction uniaxial anisotropy field. The intrinisic uniaxial anisotropy field is due to the intrinsic magnetization of the layer and the magneto striction uniaxial anisotropy field is a product of the magneto striction of the layer and stress within the layer. A positive magnetostriction of the layer and compressive stress therein results in a magnetostriction uniaxial anisotropy field that can support an intrinsic uniaxial anisotropy field. The orientations of the magnetic moments of the AP pinned layers are set by an external field. This is accomplished without the aforementioned elevated temperature which is required to free the magnetic spins of the pinning layer.

If the self-pinning of the AP pinned layer structure is not sufficient, unwanted extraneous fields can disturb the orientations of the magnetic moments of the AP pinned layers or, in a worst situation, could reverse their directions. Accordingly, there is a strong-felt need to maximize the uniaxial magnetostriction anisotropy field while maintaining a high magnetoresistive coefficient dr/R of the spin valve sensor.

It is also important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. End portions of the free layer abutting the hard bias layers are over-biased and become very stiff in their response to field signals from the rotating magnetic disk. The stiffened end portions can take up a large portion of the total width of a sub-micron sensor and can significantly reduce the amplitude of the sensor. It should also be understood that a narrow track width is important for promoting the track width density of the read head. The more narrow the track width the greater the number of tracks that can be read per linear inch along a radius of the rotating magnetic disk. This enables a further increase in the magnetic storage capacity of the disk drive.

There is a need to reduce the total stack height of the read sensor without sacrificing the magnetoresistive coefficient dr/R. There is also a need to reduce the stiffening of the magnetic moment of the free layer when longitudinally biased and to minimize disturbance of the magnetic moments of the AP pinned layers.

SUMMARY OF THE INVENTION

An aspect of the invention is to employ an exchange biasing scheme for longitudinally biasing the free layer. This is accomplished by providing the free layer with first and second wing portions which extend laterally beyond the track width of the sensor and which interface first and second antiferromagnetic (AFM) biasing layer layers so as to implement an exchange bias therebetween. This arrangement will enhance the stabilization of the free layer and will result in the read head having a higher amplitude read output.

The spin valve sensor has a central portion which extends between the first and second AFM layers. An aspect of the invention is to provide first and second lead layers which overlay the first and second AFM layers respectively and further overlay first and second portions respectively of the central portion of the spin valve sensor so that a distance between the first and second lead layers defines a track width of the sensor that is less than a distance between the first and second AFM layers. With this arrangement uniform biasing of the free layer is promoted.

A spin valve sensor further includes a cap layer structure which typically includes a layer of tantalum (Ta). Another aspect of the invention is to provide the cap layer structure with a full thickness portion which is located between first and second reduced thickness portions with the first and second lead layers engaging the cap layer structure within the first and second reduced thickness portions. Since tantalum (Ta) has a high resistance the reduced thickness portions provide less resistance between the first and second lead layers and the sensor for conducting the sense current therethrough.

A further aspect of the invention is to provide a self-pinning antiparallel (AP) pinned layer structure without an AFM pinning layer pinning the AP pinned layer structure. The self-pinning is accomplished by providing the ferromagnetic AP pinned layers within the AP pinned layer structure with uniaxial anisotropies which are oriented perpendicular to the ABS and, in combination, self-pin the magnetic moments of the first and second AP pinned layers perpendicular to the ABS and antiparallel with respect to each other. Cobalt iron (CoFe) is preferably employed for each of the first and second AP pinned layers in a self-pinned AP pinned layer structure.

An object of the present invention is to provide a low stack height spin valve sensor with an exchange biased free layer, a self-pinned antiparallel (AP) pinned layer structure which has a high magnetoresistive coefficient dr/R, a uniformly biased free layer and a narrow track width.

Another object is to provide the aforementioned spin valve sensor wherein first and second lead layers engage first and second reduced thickness portions of a cap layer structure for reducing the resistance between the lead layers and the spin valve sensor.

A further object is to provide various methods of making the foregoing read heads.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 66 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
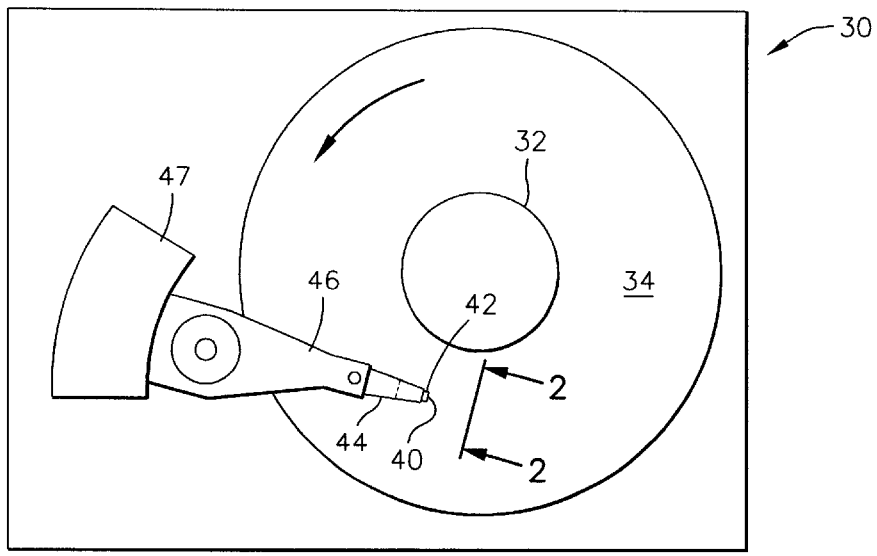
FIG. 1 is a plan view of an exemplary prior art magnetic disk drive.
Figure 2:
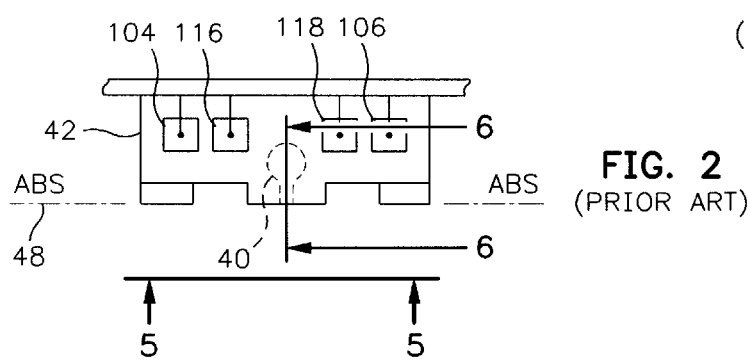
FIG. 2 is an end view of a slider with a magnetic head of the disk drive as seen in plane 2—2 of FIG. 1.
Figure 3:
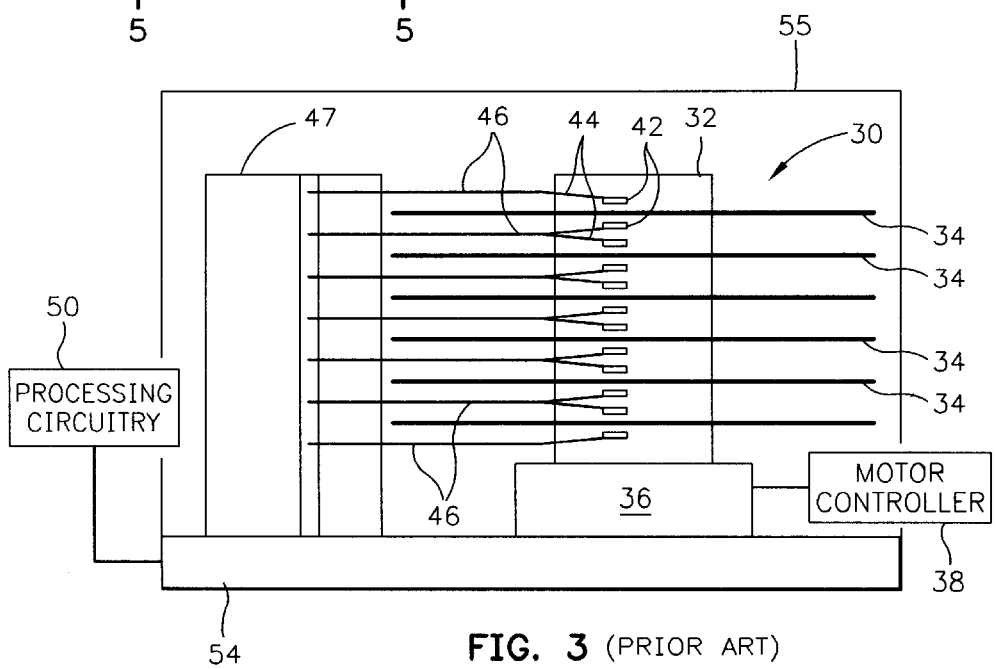
FIG. 3 is an elevation view of the magnetic disk drive wherein multiple disks and magnetic heads are employed.
Figure 4:
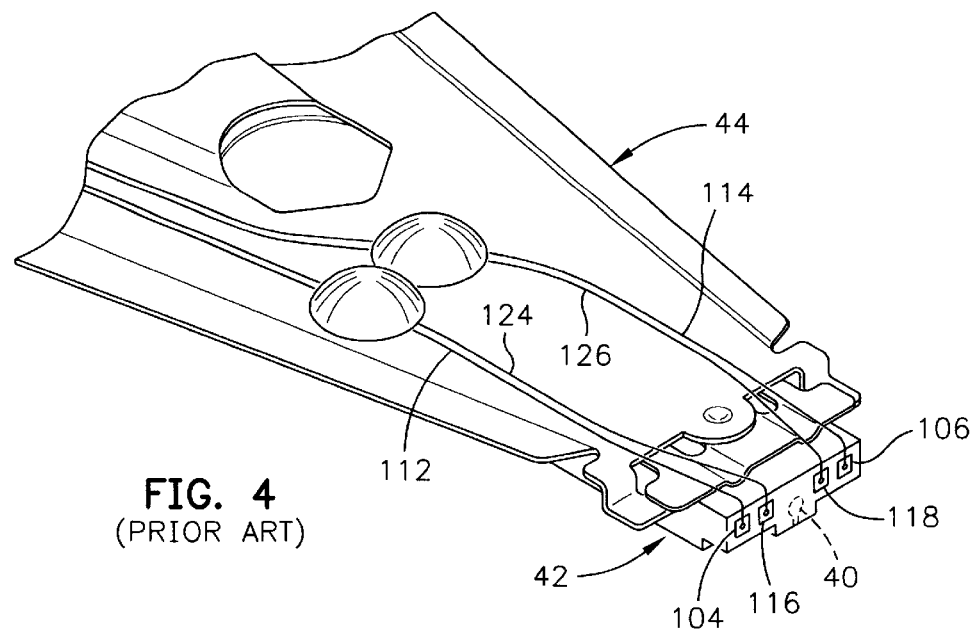
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
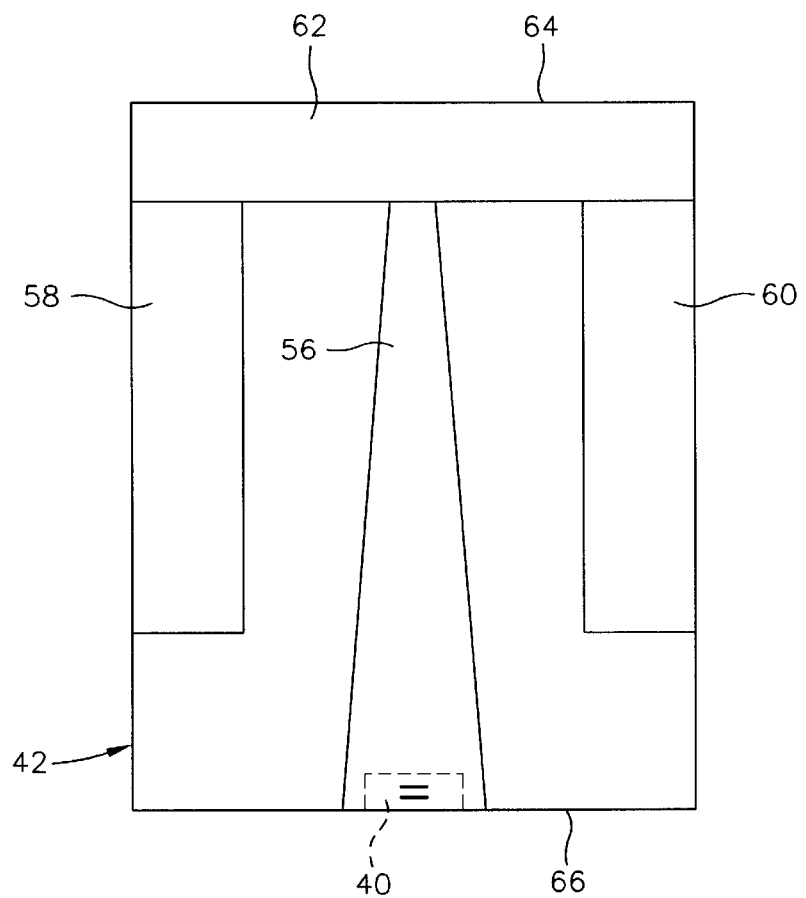
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
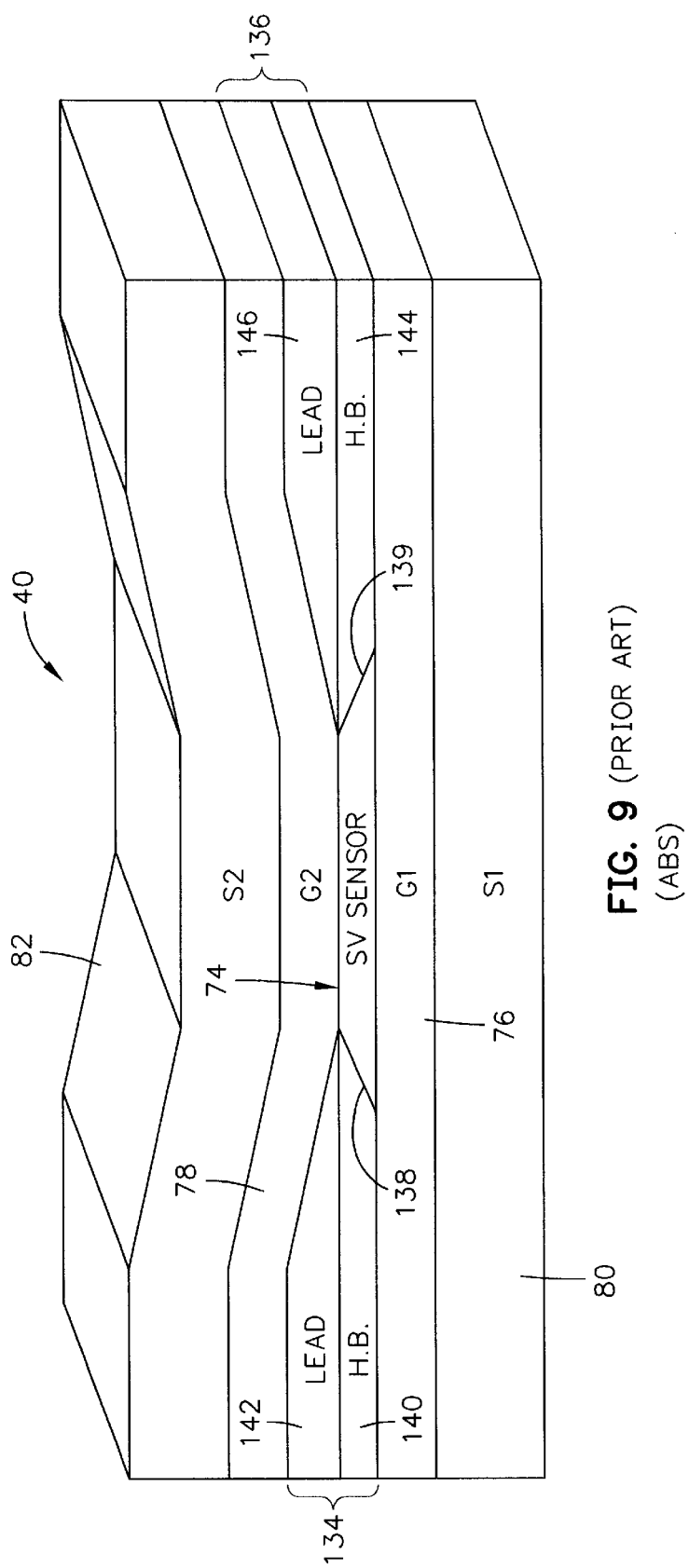
FIG. 9 is an enlarged isometric ABS illustration of the read head with a prior art spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side surfaces 138 and 139 of the spin valve sensor. This connection is known in the art as a contiguous junction and is fully described in commonly assigned U.S. Pat. No. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing a free layer in the sensor. The spin valve sensor 74 and the first and second hard bias and lead layers 134 and 136 are located between the nonmagnetic electrically insulative first and second read gap layers 76 and 78 and the first and second read gap layers 76 and 78 are, in turn, located between the ferromagnetic first and second shield layers 80 and 82.

Unfortunately, the first and second hard bias layers 140 and 144 in FIG. 9 do not uniformly stabilize the free layer within the sensor 74. Hard bias layers typically stiffen the magnetic moment of the free layer at the end portions of the sensor which abut the hard bias layers so that these portions are stiff in their response to field signals from the rotating magnetic disk. With submicron track widths, the loss in amplitude at each end of the sensor is unacceptable. Further, as the flux lines from the hard bias layers extend between the side surfaces 138 and 139, a central portion of the free layer may not be properly stabilized since magnetic flux is progressively drawn in by the first and second shield layers 80 and 82.

The Invention

Figure 10:
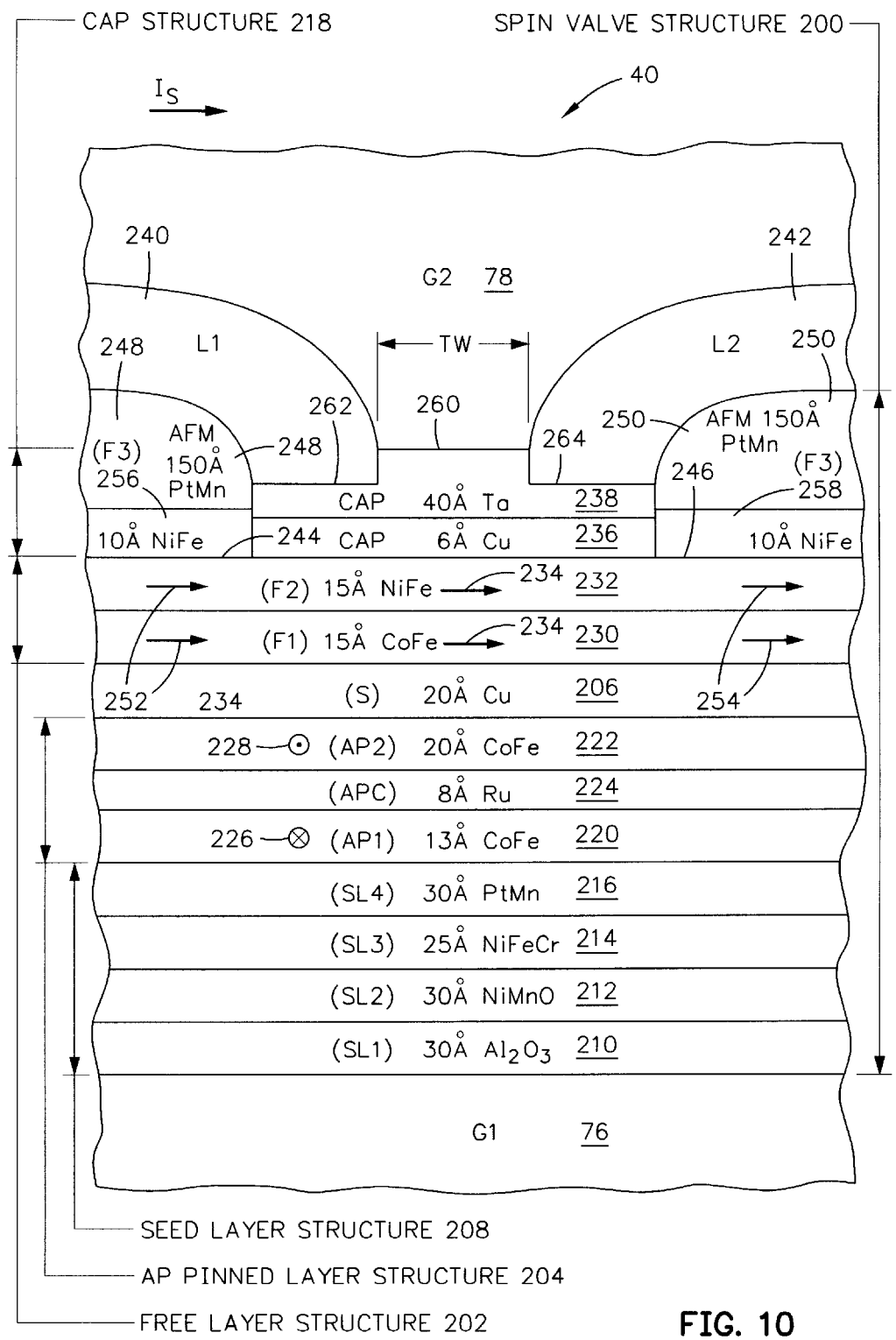
FIG. 10 is an ABS view of one embodiment of the present spin valve sensor.

One embodiment of the present spin valve sensor 200 is illustrated in FIG. 10 wherein the spin valve sensor is located between the first and second read gap layers 76 and 78. The spin valve sensor 200 includes a free layer structure 202 and an antiparallel (AP) pinned layer structure 204. A nonmagnetic electrically nonconductive spacer layer (S) 206 is located between the free layer structure 202 and the AP pinned layer structure 204. Since the free layer structure 202 is located between the AP pinned layer structure 204 and the second read gap layer 78 and the first pole piece layer 92 the spin valve sensor 200 is a bottom spin valve sensor. A seed layer structure 208 may be located between the first read gap layer 76 and the AP pinned layer structure 204. The seed layer structure 208 may include first, second, third and fourth seed layers (SL1), (SL2), (SL3) and (SL4) 210, 212, 214 and 216. These seed layers, with the thicknesses and materials shown, have been found to promote a desirable texture of the layers deposited thereon. A cap layer structure 218 is located on top of the free layer structure 202 for protecting the free layer structure from subsequent processing steps.

It should be noted that the spin valve sensor does not include the typical antiferromagnetic (AFM) pining layer for pining magnetic moments of the AP pinned layer structure 204. An aspect of the invention is to provide an AP pinned layer structure 204 which is self-pinning. The AP pinned layer structure 204 includes ferromagnetic first and second AP pinned layers (AP1) and (AP2) 220 and 222. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either toward the ABS or away from the ABS, as shown in FIG. 10, and the second AP pinned layer has a magnetic moment 228 which is oriented antiparallel to the magnetic moment 226 by a strong antiparallel coupling between the first and second AP pinned layers 220 and 222. The preferred material for the first and second AP pinned layers 220 and 222 is cobalt iron (CoFe).

In a preferred embodiment, one of the AP pinned layers is thicker than the other, such as the first AP pinned layer 220 may be 13 Å and the second AP pinned layer 222 may be 20 Å. With this arrangement, the magnetic moment 228 of the second AP pinned layer becomes dominant and determines the directions of the magnetic moments 226 and 228. The direction of the magnetic moment 228, either into or out of the sensor, is determined by the direction in which the magnetic moment 228 is set by an external magnetic field. With the arrangement shown in FIG. 10, the magnetic field has been applied out of the sensor which causes the magnetic moment 228 to be directed out of the sensor. If the external field is reversed in its direction, the magnetic moment 228 would be directed into the sensor. Alternatively, the first AP pinned layer 220 may be thicker than the second AP pinned layer 222. When the AP pinned layers 220 and 222 are formed by sputter deposition they are preferably deposited in the presence of a field which is oriented perpendicular to the ABS. In this manner, the easy axes of the first and second AP pinned layers will likewise be oriented perpendicular to the ABS.

The free layer structure 202 may include first and second free layers (F1) and (F2) 230 and 232. It has been found that when the free layer structure 202 has a cobalt iron first free layer 230 between the spacer layer 206 and a nickel iron second free layer 232 that the magnetoresistive coefficient dR/R of the spin valve sensor is increased. The free layer structure has a magnetic moment 234 which is oriented parallel to the ABS and parallel to the major thin film planes of the layers. A sense current $I_S$ is conducted through the spin valve sensor from right to left or from left to right, as shown in FIG. 10. When a field signal from the rotating magnetic disk rotates the magnetic moment 234 into the sensor the magnetic moments 234 and 228 become more antiparallel which increases the resistance of the sensor to the sense current $I_S$ and when a field signal rotates the magnetic moment 234 out of the sensor the magnetic moments 234 and 228 become more parallel which decreases the resistance of the sensor to the sense current $I_S$. These resistance changes change potentials within the processing circuitry 50 in FIG. 3 which are processed as playback signals. The cap layer structure 218 may include first and second cap layers 236 and 238 wherein the first cap layer is copper and the second cap layer is tantalum. The copper layer 236 has been found to provide a better interface between the nickel iron second free layer 232 and the tantalum cap layer 238.

The read head has an electrical track width (TW) which is defined by a distance between first and second lead layers (L1) and (L2) 240 and 242 which will be discussed in more detail hereinbelow. The free layer structure 202 has first and second wing portions 244 and 246 which extend laterally beyond the track width. First and second antiferromagnetic (AFM) pinning layers 248 and 250 are exchange coupled to the first and second wing portions 244 and 246 so as to pin, by exchange coupling with the wing portions, magnetic moments 252 and 254 of the wing portions parallel to the ABS and parallel to the major thin film planes of the layers.

The magnetic moments 252 and 254, in turn, align and stabilize the magnetic moment 234 of a central portion of the free layer structure located within the track width (TW). In a preferred embodiment, the free layer structure 202 includes additional free layer portions (F3) 256 and 258 wherein the additional free layer portion 256 is located between the wing portion 244 and the AFM layer 248 and the additional free layer portion 258 is located between the wing portion 246 and the AFM layer 250. In a preferred embodiment, each of the AFM layers 248 and 250 is platinum manganese (PtMn). After completion of the head, the head may be heated to or near the blocking temperature of platinum manganese, which is about 350° C., in the presence of a field oriented parallel to the ABS and parallel to the major thin film planes of the layers. This will set the magnetic moments 252 and 254 of the wing portions, as shown in FIG. 10. Each of the layers 210, 212, 214, 216, 220, 224, 222 and 206 may extend beyond the track width and have wing portions below the wing portions 244 and 246 of the free layer structure.

It should be noted that without an AFM pinning layer for the AP pinned layer structure 204 that the setting of the magnetic spins of the AFM layers 248 and 250 will not cause a disturbance of the operation of the AP pinned layer structure. This then enables the use of a single material for the AFM layers 248 and 250. The present invention enables the use of platinum manganese (PtMn) as the single AFM pinning material employed in the read head.

As shown in FIG. 10, the spin valve sensor has a central portion 260 that extends between the first and second AFM layers 248 and 250. An aspect of the invention is that the first and second lead layers 240 and 242 overlay the first and second AFM layers respectively and further overlay first and second portions 262 and 264 respectively of the central portion so that a distance between the first and second lead layers defines a track width (TW) that is less than the distance between the first and second AFM layers 248 and 250. Another aspect of the invention is that the cap layer structure 218 has a full thickness portion which is located between first and second reduced thickness portions, which reduced thickness portions may be the aforementioned first and second portions 262 and 264. The first and second lead layers 240 and 242 engage the cap layer structure within the first and second reduced thickness portions 262 and 264. Since the top cap layer is typically tantalum (Ta), which has a high resistance, the reduced thickness portions 262 and 264 lessen the high resistance between the first and second lead layers 240 and 242 and the read sensor for conducting the sense current $I_S$ therethrough.

Exemplary thicknesses and materials of the layers are 30 Å of $Al_2O_3$ for layer 210, 30 Å of NiMnO for the layer 212, 25 Å of NiFeCr for the layer 214, 30 Å of PtMn for the layer 216, 13 Å of CoFe for the layer 220, 8 Å of Ru for the layer 224, 20 Å of CoFe for the layer 222, 20 Å of Cu for the layer 206, 15 Å of CoFe for the layer 230, 15 Å of NiFe for the layer 232, 6 Å of Cu for the layer 236, 40 Å of Ta for the layer 238, 10 Å of NiFe for the layers 256 and 258, and 120 Å of PtMn for the layers 248 and 250.

Figure 11:
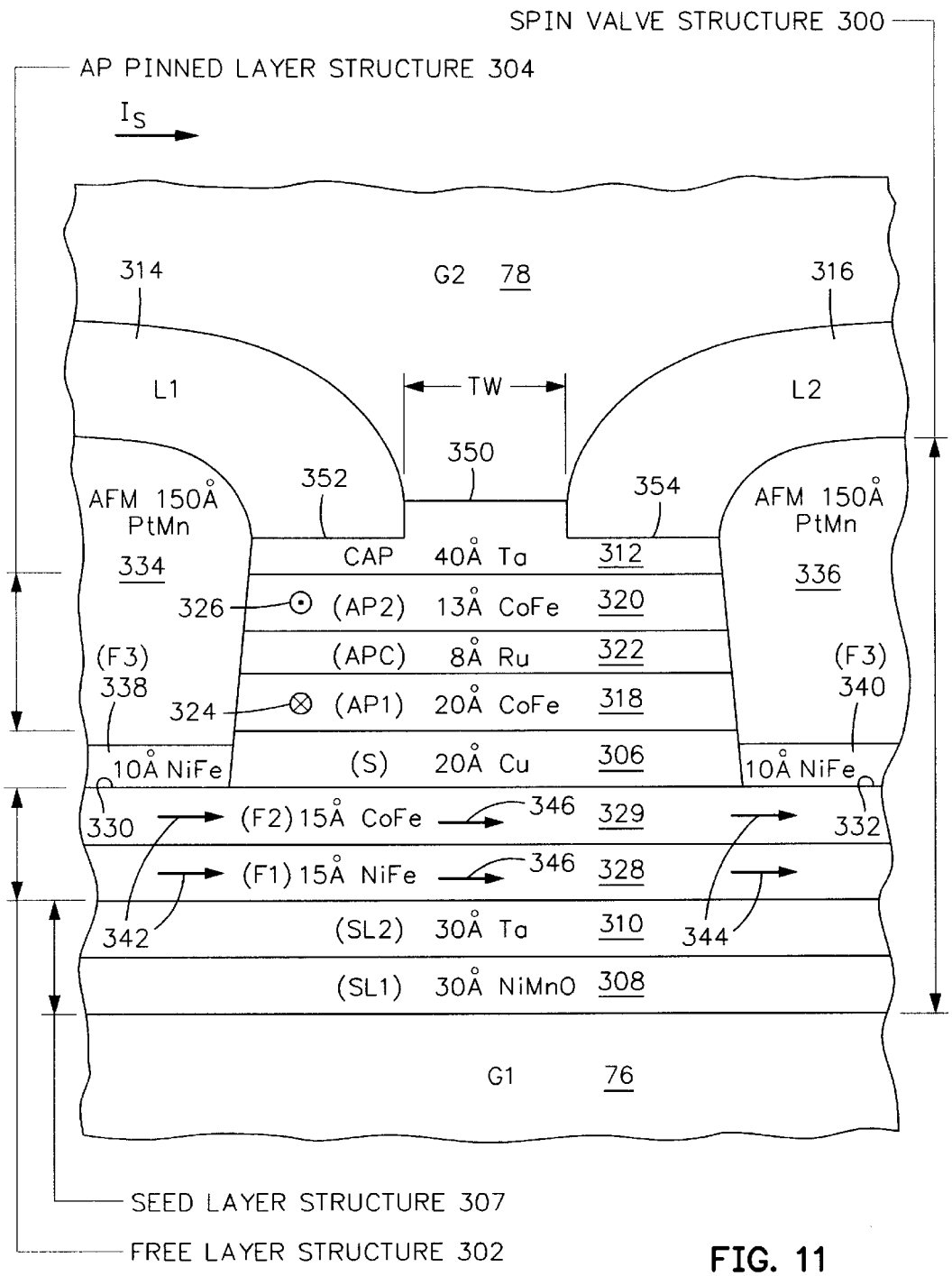
FIG. 11 is an ABS view of another embodiment of the present spin valve sensor.

FIG. 11 is another embodiment of the present invention which is a top spin valve 300. The spin valve 300 is located between the first and second read gap layers 76 and 78. The spin valve sensor 300 includes a free layer structure 302 and an AP pinned layer structure 304. A nonmagnetic electrically conductive spacer layer (S) 306 is located between the free layer structure 302 and the AP pinned layer structure 304. A seed layer structure 307 is located between the free layer structure 302 and the first read gap layer 76 and may include first and second seed layers (SL1) and (SL2) 308 and 310. With the first seed layer being nickel manganese oxide and the second seed layer being tantalum, the texture of the layers deposited thereon has been found to be improved. A cap layer 312 is located on the pinned layer structure 304 for protecting it from subsequent processing steps. Again, the track width of the read head is defined by the distance between first and second lead layers (L1) and (L2) 314 and 316 which will be described in more detail hereinbelow. The pinned layer structure 304 has ferromagnetic first and second AP pinned layers (AP1) and (AP2) 318 and 320. A nonmagnetic electrically conductive antiparallel coupling layer (APC) 322 is located between the AP pinned layers 318 and 320. The AP pinned layers 318 and 320 have magnetic moments 324 and 326 which are self-pinned in the same manner as described for the AP pinned layer structure 204 in FIG. 10.

The free layer structure has first and second free layers (F1) and (F2) 328 and 329. The free layer structure 302 further has first and second wing portions 330 and 332 which extend laterally beyond the track width (TW) and are exchange coupled to first and second AFM layers 334 and 336. The free layer structure may be provided with additional free layers (F3) 338 and 340 beyond the track width for improving the strength of magnetic moments 342 and 344 of the wing portions 330 and 332. Again, the magnetic moments 342 and 344 align and stabilize the magnetic moment 346 of the central portion of the free layer structure within the track width. If desired, the first and second seed layers 308 and 310 may extend laterally beyond the track width and provide support for the wing portions 330 and 332 of the free layer structure. The operation and setting of the top spin valve sensor in FIG. 11 is the same as that described for the bottom spin valve sensor in FIG. 10.

In the same manner as the spin valve sensor 200 in FIG. 10 the spin valve sensor 300 in FIG. 11 has a central portion 350 which extends between the first and second AFM layers 334 and 336. The first and second lead layers 314 and 316 overlay the first and second AFM layers 334 and 336 respectively and further overlay first and second portions 352 and 354 respectively of the central portion so that a distance between the first and second lead layers 314 and 316 defines a track width (TW) that is less than a distance between the first and second AFM layers. A further aspect of the invention is that the cap layer 312 has a full thickness portion which is located between first and second reduced thickness portions which may coincide with the aforementioned first and second portions 352 and 354. The first and second lead layers 314 and 316 engage the cap layer 312 within the first and second reduced thickness portions 352 and 354. As stated hereinabove, when the cap layer 312 is tantalum (Ta) this is a high resistance material between the lead layers and the spin valve sensor. With the arrangement just described, the reduced thickness portions 352 and 354 of the cap layer 312 reduce the resistance between the first and second lead layers 314 and 316 and the spin valve sensor for conducting the sense current $I_S$ therethrough.

Exemplary thicknesses of materials of the spin valve sensor shown in FIG. 11 are 30 Å of NiMnO for the first seed layer 308, 30 Å of Ta for the second seed layer 310, 15 Å of NiFe for the layer 328, 15 Å of CoFe for the layer 329, 20 Å of Cu for the layer 306, 20 Å of CoFe for the layer 318, 8 Å of Ru for the layer 322, 13 Å of CoFe for the layer 320, 40 Å of Ta for the layer 312, 10 Å of NiFe for the layers 338 and 340, and 120 Å of PtMn for the layers 334 and 336.

Discussion

It has been found that by removing the pinning layer for pinning a magnetic moment of the AP pinned layer that the amplitude read output of the read head can be increased 40%. Further, by uniformly stabilizing the free layer structure and employing the lead overlay scheme the amplitude is still further increased and the track width of the read head can be made more narrow to increase the read bit density of the read head. It should also be noted that by omitting an AFM pinning layer for the AP pinned layer structure in each of the embodiments in FIGS. 10 and 11 that the stack height of the sensor is significantly less. With an AFM pinning layer the stack height would be increased about 120 Å. The lower stack height promotes a more narrow gap between the first and second shield layers 80 and 82 in FIGS. 6 and 7 which enables the read head to read more bits per linear inch along a linear track of a rotating magnetic disk. It should be understood that the slider supporting the magnetoresistive sensor may have a head surface other than the aforementioned ABS such as a tape surface for use in a tape drive. Further, the inventive concepts are applicable to magnetoresistive sensors other than spin valve sensors such as an anisotropic magnetoresistive (AMR) sensor.

A method for constructing the reduced thickness portions 262 and 264 in FIG. 10 and the reduced thickness portions 352 and 354 in FIG. 11 is to form a bilayer resist layer on only the full thickness portion of the cap layer structure and then ion mill, such as reactive ion etching (RIE), into the cap layer so as to reduce its thickness at each end. While the photoresist layer is still in place the first and second lead layers may then be sputter deposited so that they are located in the reduced thickness portions of the cap layer structure and cover the first and second AFM layers. The bilayer resist can then be removed by a dissolution process.

The following commonly assigned U.S. patents are incorporated in their entirety by reference herein: (1) U.S. Pat. No. 5,465,185; (2) U.S. Pat. No. 5,583,725; (3) U.S. Pat. No. 5,768,069; (4) U.S. Pat. No. 6,040,961; (5) U.S. Pat. No. 6,117,569; (6) U.S. Pat. No. 6,127,053; and (7) U.S. Pat. No. 6,219,211 B1.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:
1. A magnetic head assembly that has a head surface for facing a magnetic medium, comprising:
   a read head that includes a magnetoresistive sensor;
   the magnetoresistive sensor including:
     an antiparallel (AP) pinned layer structure;
     a ferromagnetic free layer having a magnetic moment that is free to rotate in response to a field signal; and
     a nonmagnetic electrically conductive spacer layer located between the free layer and the AP pinned layer structure;
   the antiparallel (AP) pinned layer structure including:
     ferromagnetic first and second antiparallel (AP) pinned layers;
     an antiparallel (AP) coupling layer located between and interfacing the first and second AP pinned layers; and
     the first and second AP pinned layers self pinning one another without assistance of a pinning layer;
   the free layer having first and second wing portions that extend in first and second lateral directions beyond a track width of the sensor;
   first and second antiferromagnetic (AFM) layers exchange coupled to said first and second wing portions for longitudinally biasing the magnetic moment of the free layer parallel to the head surface and parallel to major planes of the layers of the read head;

the magnetoresistive sensor having a central portion that extends between said first and second AFM layers; and first and second lead layers overlaying the first and second AFM layers respectively and further overlaying first and second portions respectively of said central portion so that a distance between the first and second lead layers defines a track width that is less than a distance between the first and second AFM layers.

2. A magnetic head assembly as claimed in claim 1 including:

nonmagnetic electrically nonconductive first and second read gap layers;

the spin valve sensor being located between the first and second read gap layers;

ferromagnetic first and second shield layers; and the first and second read gap layers being located between the first and second shield layers.

3. A magnetic head assembly as claimed in claim 2 further comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions.

4. A magnetic head assembly as claimed in claim 3 wherein the free layer is located between the AP pinned layer structure and the first pole piece layer.

5. A magnetic head assembly as claimed in claim 3 wherein the AP pinned layer structure is located between the free layer and the first pole piece layer.

6. A magnetic head assembly that has a head surface for facing a magnetic medium, comprising:

a read head that includes a magnetoresistive sensor;

the magnetoresistive sensor including:

an antiparallel (AP) pinned layer structure;

a ferromagnetic free layer having a magnetic moment that is free to rotate in response to a field signal; and a nonmagnetic electrically conductive spacer layer located between the free layer and the AP pinned layer structure;

the antiparallel (AP) pinned layer structure including:

ferromagnetic first and second antiparallel (AP) pinned layers;

an antiparallel (AP) coupling layer located between and interfacing the first and second AP pinned layers; and the first and second AP pinned layers self pinning one another without assistance of a pinning layer;

the free layer having first and second wing portions that extend in first and second lateral directions beyond a track width of the sensor;

first and second antiferromagnetic (AFM) layers exchange coupled to said first and second wing portions for longitudinally biasing the magnetic moment of the free layer parallel to the head surface and parallel to major planes of the layers of the read head;

the magnetoresistive sensor having a central portion that extends between said first and second AFM layers;

first and second lead layers overlaying the first and second AFM layers respectively and further overlaying first and second portions respectively of said central portion so that a distance between the first and second lead layers defines a track width that is less than a distance between the first and second AFM layers;

a cap layer structure that has a full thickness portion and first and second reduced thickness portions with the full thickness portion located between the first and second reduced thickness portions; and said first and second lead layers engaging the cap layer structure within said first and second reduced thickness portions.

7. A magnetic head assembly that has a head surface for facing a magnetic medium, comprising:

a read head that includes:

nonmagnetic electrically nonconductive first and second read gap layers;

a magnetoresistive sensor being located between the first and second read gap layers;

ferromagnetic first and second shield layers; and the first and second read gap layers being located between the first and second shield layers;

the magnetoresistive sensor including:

an antiparallel (AP) pinned layer structure;

a ferromagnetic free layer having a magnetic moment that is free to rotate in response to a field signal; and a nonmagnetic electrically conductive spacer layer located between the free layer and the AP pinned layer structure;

the antiparallel (AP) pinned layer structure including:

ferromagnetic first and second antiparallel (AP) pinned layers;

an antiparallel (AP) coupling layer located between and interfacing the first and second AP pinned layers; and the first and second AP pinned layers self pinning one another without assistance of a pinning layer;

the free layer having first and second wing portions that extend in first and second lateral directions beyond a track width of the sensor;

first and second antiferromagnetic (AFM) layers exchange coupled to said first and second wing portions for longitudinally biasing the magnetic moment of the free layer parallel to the head surface and parallel to major planes of the layers of the read head;

the magnetoresistive sensor having a central portion that extends between said first and second AFM layers;

first and second lead layers overlaying the first and second AFM layers respectively and further overlaying first and second portions respectively of said central portion so that a distance between the first and second lead layers defines a track width that is less than a distance between the first and second AFM layers;

a cap layer structure that has a full thickness portion which is located between first and second reduced thickness portions;

said first and second lead layers engaging the cap layer structure within said first and second reduced thickness portions;

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions.

8. A magnetic disk drive including at least one magnetic head assembly that has a head surface for facing a magnetic medium and that includes a write head and a read head, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
nonmagnetic electrically nonconductive first and second read gap layers;
a magnetoresistive sensor located between the first and second read gap layers;
ferromagnetic first and second shield layers; and
the first and second read gap layers being located between the first and second shield layers;

the magnetoresistive sensor including:
an antiparallel (AP) pinned layer structure;
a ferromagnetic free layer having a magnetic moment that is free to rotate in response to a field signal; and
a nonmagnetic electrically conductive spacer layer located between the free layer and the AP pinned layer structure;

the antiparallel (AP) pinned layer structure including:
ferromagnetic first and second antiparallel (AP) pinned layers;
an antiparallel (AP) coupling layer located between and interfacing the first and second AP pinned layers;
the first and second AP pinned layers self pinning one another without assistance of a pinning layer;

the free layer having first and second wing portions that extend in first and second lateral directions beyond a track width of the sensor;

first and second antiferromagnetic (AFM) layers exchange coupled to said first and second wing portions for longitudinally biasing the magnetic moment of the free layer parallel to the head surface and parallel to major planes of the layers of the read head;

the spin valve sensor having a central portion that extends between said first and second AFM layers; and first and second lead layers overlaying the first and second AFM layers respectively and further overlaying first and second portions respectively of said central portion so that a distance between the first and second lead layers defines a track width that is less than a distance between the first and second AFM layers;

a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

9. A magnetic disk drive as claimed in claim 8 wherein the free layer is located between the AP pinned layer structure and the first pole piece layer.

10. A magnetic disk drive as claimed in claim 8 wherein the AP pinned layer structure is located between the free layer and the first pole piece layer.

11. A magnetic disk drive including at least one magnetic head assembly that has a head surface for facing a magnetic medium and that includes a write head and a read head, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
nonmagnetic electrically nonconductive first and second read gap layers;
a magnetoresistive sensor located between the first and second read gap layers;
ferromagnetic first and second shield layers; and
the first and second read gap layers being located between the first and second shield layers;

the magnetoresistive sensor including:
an antiparallel (AP) pinned layer structure;
a ferromagnetic free layer having a magnetic moment that is free to rotate in response to a field signal; and
a nonmagnetic electrically conductive spacer layer located between the free layer and the AP pinned layer structure;

the antiparallel (AP) pinned layer structure including:
ferromagnetic first and second antiparallel (AP) pinned layers;
an antiparallel (AP) coupling layer located between and interfacing the first and second AP pinned layers;
the first and second AP pinned layers self pinning one another without assistance of a pinning layer;

the free layer having first and second wing portions that extend in first and second lateral directions beyond a track width of the sensor;

first and second antiferromagnetic (AFM) layers exchange coupled to said first and second wing portions for longitudinally biasing the magnetic moment of the free layer parallel to the head surface and parallel to major planes of the layers of the read head;

the spin valve sensor having a central portion that extends between said first and second AFM layers; and first and second lead layers overlaying the first and second AFM layers respectively and further overlaying first and second portions respectively of said central portion so that a distance between the first and second lead layers defines a track width that is less than a distance between the first and second AFM layers;

a cap layer structure that has a full thickness portion and first and second reduced thickness portions with the full thickness portion located between the first and second reduced thickness portions; and said first and second lead layers engaging the cap layer structure within said first and second reduced thickness portions;

a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

12. A method of making a magnetic head assembly which has a head surface for facing a magnetic medium, comprising the steps of:

forming a read head that includes a magnetoresistive sensor;

a making of the magnetoresistive sensor including the steps of:

forming an antiparallel (AP) pinned layer structure;

forming a ferromagnetic free layer with a magnetic moment that is free to rotate in response to a field signal; and forming a nonmagnetic electrically conductive spacer layer between the free layer and the AP pinned layer structure;

the forming of the antiparallel (AP) pinned layer structure including the steps of:

forming ferromagnetic first and second antiparallel (AP) pinned layers;

forming an antiparallel (AP) coupling layer between and interfacing the first and second AP pinned layers; and the first and second AP pinned layers being further formed to self pin one another without assistance of a pinning layer;

the free layer being further formed with first and second wing portions that extend in first and second lateral directions beyond a track width of the sensor;

forming first and second antiferromagnetic (AFM) layers exchange coupled to said first and second wing portions for longitudinally biasing the magnetic moment of the free layer parallel to the head surface and parallel to major planes of the read head; and forming the magnetoresistive sensor with a central portion that extends between said first and second AFM layers; and forming first and second lead layers overlaying the first and second AFM layers respectively and further overlaying first and second portions respectively of said central portion so that a distance between the first and second lead layers defines a track width that is less than a distance between the first and second AFM layers.

13. A magnetic head assembly as claimed in claim 12 including the steps of:

forming nonmagnetic electrically nonconductive first and second read gap layers with the spin valve sensor located therebetween; and forming ferromagnetic first and second shield layers with the first and second read gap layers located therebetween.

14. A method of making a magnetic head assembly as claimed in claim 13 further comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and second pole piece layers at said back gap region.

15. A method as claimed in claim 14 wherein the free layer is formed between the AP pinned layer structure and the first pole piece layer.

16. A method as claimed in claim wherein 14 the AP pinned layer structure is located between the free layer and the first pole piece layer.

17. A method of making a magnetic head assembly which has a head surface for facing a magnetic medium, comprising the steps of:

forming a read head that includes a magnetoresistive sensor;

a making of the magnetoresistive sensor including the steps of:

forming an antiparallel (AP) pinned layer structure;

forming a ferromagnetic free layer with a magnetic moment that is free to rotate in response to a field signal; and forming a nonmagnetic electrically conductive spacer layer between the free layer and the AP pinned layer structure;

the forming of the antiparallel (AP) pinned layer structure including the steps of:

forming ferromagnetic first and second antiparallel (AP) pinned layers;

forming an antiparallel (AP) coupling layer between and interfacing the first and second AP pinned layers; and the first and second AP pinned layers being further formed to self pin one another without assistance of a pinning layer;

the free layer being further formed with first and second wing portions that extend in first and second lateral directions beyond a track width of the sensor;

forming first and second antiferromagnetic (AFM) layers exchange coupled to said first and second wing portions for longitudinally biasing the magnetic moment of the free layer parallel to the head surface and parallel to major planes of the read head;

forming the magnetoresistive sensor with a central portion that extends between said first and second AFM layers;

forming first and second lead layers overlaying the first and second AFM layers respectively and further overlaying first and second portions respectively of said central portion so that a distance between the first and second lead layers defines a track width that is less than a distance between the first and second AFM layers;

forming a cap layer structure that has a full thickness portion and first and second reduced thickness portions with the full thickness portion located between the first and second reduced thickness portions; and forming said first and second lead layers engaging the cap layer structure within said first and second reduced thickness portions.

18. A method of making a magnetic head assembly which has a head surface for facing a magnetic medium, comprising the steps of:

forming a read head that includes the steps of:

forming nonmagnetic electrically nonconductive first and second read gap layers with a magnetoresistive sensor located therebetween; and forming ferromagnetic first and second shield layers with the first and second read gap layers located therebetween;

a making of the magnetoresistive sensor including the steps of:

forming an antiparallel (AP) pinned layer structure;

forming a ferromagnetic free layer with a magnetic moment that is free to rotate in response to a field signal; and forming a nonmagnetic electrically conductive spacer layer between the free layer and the AP pinned layer structure;

the forming of the antiparallel (AP) pinned layer structure including the steps of:

forming ferromagnetic first and second antiparallel (AP) pinned layers;

forming an antiparallel (AP) coupling layer between and interfacing the first and second AP pinned layers; and the first and second AP pinned layers being further formed to self pin one another without assistance of a pinning layer;

the free layer being further formed with first and second wing portions that extend in first and second lateral directions beyond a track width of the sensor;

forming first and second antiferromagnetic (AFM) layers exchange coupled to said first and second wing portions for longitudinally biasing the magnetic moment of the free layer parallel to the head surface and parallel to major planes of the read head; and forming the magnetoresistive sensor with a central portion that extends between said first and second AFM layers;

forming first and second lead layers overlaying the first and second AFM layers respectively and further overlaying first and second portions respectively of said central portion so that a distance between the first and second lead layers defines a track width that is less than a distance between the first and second AFM layers;

forming a cap layer structure that has a full thickness portion and first and second reduced thickness portions with the full thickness portion located between first and second reduced thickness portions; and forming said first and second lead layers engaging the cap layer structure within said first and second reduced thickness portions;

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and second pole piece layers at said back gap region.

\* \* \* \* \*